US 6,650,106 B2

(12) United States Patent  
Daalmans et al.

(10) Patent No.: US 6,650,106 B2  
(45) Date of Patent: Nov. 18, 2003

(54) DEVICE FOR EDDY CURRENT MEASUREMENT OF A MOTION OF A CONDUCTING BODY IN A MAGNETIC FIELD (75) Inventors: Gabriel Daalmans, Hoechstadt (DE); Roland Finkler, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/266,978

(22) Filed: Oct. 8, 2002

(65) Prior Publication Data

US 2003/0071612 A1 Apr. 17, 2003

(30) Foreign Application Priority Data

Oct. 9, 2001 (DE) .......................... 101 49 794

(51) Int. Cl.[7] ................................. G01P 3/46
(52) U.S. Cl. ................... 324/164; 324/207.16
(58) Field of Search ................. 324/164, 163, 324/174, 207.12, 207.13, 207.22, 207.26, 207.24, 207.25, 207.16; 73/650, 514.39

(56) References Cited

U.S. PATENT DOCUMENTS 3,359,492 A   12/1967  Siemens
4,439,728 A * 3/1984  Rickman, Jr. ............... 324/164
4,751,459 A * 6/1988  Stupak, Jr. .................. 324/164
6,469,500 B1 * 10/2002 Schmitz et al. ........ 324/207.16

FOREIGN PATENT DOCUMENTS

| DE | 37 30 841 A1 | 3/1988 |
| DE | 198 28 372 A1 | 12/1999 |
| DE | 100 32 143 A1 | 5/2001 |
| DE | 100 39 324 C1 | 4/2002 |
| GB | 1 122 097 | 7/1968 |

* cited by examiner

Primary Examiner—Jay Patidar  
Assistant Examiner—Subhash Zaveri  
(74) Attorney, Agent, or Firm—Henry M. Feiereisen (57) ABSTRACT A motion parameter of an at least partially conducting moving body is measured with a measuring device having at least one coil with a coil axis tangential to the motion direction of the moving body. A primary magnetic field induces electrical currents in the moving body that generate a motion-dependent measuring magnetic field which is measured by the measuring device. The tangential coil(s) has/have a greater distance from the moving body than the primary magnets.

35 Claims, 7 Drawing Sheets

DEVICE FOR EDDY CURRENT MEASUREMENT OF A MOTION OF A CONDUCTING BODY IN A MAGNETIC FIELD

CROSS-REFERENCES TO RELATED APPLICATIONS

This application claims the priority of German Patent Application, Serial No. 101 49 794.6, filed Oct. 9, 2001, pursuant to 35 U.S.C. 119(a)–(d), the disclosure of which is incorporated herein by reference.

BACKGROUND OF THE INVENTION

The present invention relates to a device for measuring a motion of a moving body, and more particularly to a motion sensor capable of inductively measuring the velocity and acceleration of a moving body.

A motion sensor for inductively measuring the velocity and acceleration of a moving body is known, for example, from German Pat. No. DE 37 30 841 A1. A primary time-independent magnetic field that passes through a disk orthogonally to the direction of motion, is produced in a locally confined partial area of the disk near the edge of the rotating, electrically conducting disk that forms the moving body. For producing the primary field, two opposing permanent magnets are provided along an air gap through which the disk extends. These permanent magnets are also magnetically short-circuited on the sides facing away from the disk by a yoke made out of a magnetic material, for example iron, so as to form a closed magnetic circuit. The primary magnetic field of the permanent magnets induces in the moving disk locally electrical eddy currents which in turn induce a counteracting magnetic eddy current field. A Hall effect sensor or another magnetic field sensor, for example a magneto-resistive sensor, is provided on both sides of the gap for measuring the magnetic flux density produced by the eddy currents. The magnetic field sensor can determine the tangential velocity or the angular velocity of the disk. Each of the two magnetic field sensors is arranged in a gap of a corresponding flux collector ring made of magnetic material, for example iron, and also in the air gap between the two permanent magnets. Each of the flux connector rings defines a magnetic flux path in form of a loop which extends parallel to the disk or to the rotation plane of the disk and perpendicular to the primary field. Each of the flux connector rings has a linear segment which extends between the corresponding permanent magnets and the disk, wherein the gap with the magnetic field sensor is formed in the center of the segment, and a second U-shaped segment which is connected with the first straight segment and complements the first linear segment to form a closed flux path, with the U-shaped second segment projecting outwardly from the gap. The second segment of each of the two flux connector rings is surrounded outside the gap by a corresponding detector coil. These two detector coils measure the temporal variation of the flux density produced by the eddy currents and thereby provide a measurement signal for the temporal change of the tangential velocity or the rotation speed, and also for the acceleration or the rotational acceleration speed of the disk. Both the magnetic field sensors and the detector coils are oriented so as to measure the flux of the eddy current field which extends tangentially to the motion direction. According to DE 37 30 841 A1, both the magnetic field sensor and the induction coils are arranged closer to the moving body than the two permanent magnets and, on the other hand, as viewed in the motion direction, at the same height as the partial region in the moving body through which the primary magnetic field passes.

The device described in DE 37 30 841 A1 measures the tangential component of the measuring magnetic field in the air gap between the permanent magnets. However, since the tangential component can be accurately measured only at a relative large distance from the moving body, the permanent magnets in this prior-art device have to be arranged quite far from each other. As a result, the applied magnetic field becomes relatively small due to demagnetizing effects, resulting in a correspondingly small useful signal.

It would therefore be desirable and advantageous to provide an improved device for measuring a motion of a moving body to obviate prior art shortcomings.

SUMMARY OF THE INVENTION

According to one aspect of the present invention, a device for measuring a motion of an moving body (or: moved object) which is electrically conducting at least partially in a certain region includes magnetic field generating means (or: magnetic field sources) for producing a magnetic field (or: exciter field) which induces electric currents in the electrically conducting area of the moving body depending on the motion of the moving body, and at least one measuring device (or: detection device) for measuring a measuring magnetic field (or: measuring induction field) induced by the electric currents in the electrically conducting area of the moving body as a measure for at least one motion parameter of the moving body. The measuring device(s) measure(s) the measuring magnetic field at one location, where the field is at least approximately parallel to the motion direction. The magnetic field generating means are located closer to the moving body than the measuring device.

The term magnetic field or measuring magnetic field is used both for the traditional magnetic field—as used in the physical sciences—as well as for a magnetic induction field (or: the magnetic flux density) or a magnetic flux, or a combination thereof. The measurement or evaluation of the measuring magnetic field also includes measuring or evaluating its temporal change or another function of the measuring magnetic field. For measuring the moving body in the magnetic field, only the relative motion between the moving body and the magnetic field is important. Accordingly, the moving body can be stationary relative to a pre-determined reference system, in particular the earth surface or to a machine part, and the magnetic field can be moved relative to the reference system or the magnetic field can be stationary relative to the reference system or the moving body can be moved relative to the reference system. The motion of the moving body is generally arbitrary and can be a translation, for example a linear motion, or a rotation, as well as a combination of a translation and rotation.

The invention is based on the concept, that the tangential magnetic field of the electric currents induced into moving body during its motion in the applied magnetic field of the magnetic field generating means can be measured with one or several measuring devices, and that these measuring devices can be to placed at a greater distance from the moving body than the magnetic field generating means. The invention is based on the observation that the tangential measuring magnetic field is relatively homogeneous or uniform, so that the distance between the measuring device and the moving body can be varied over a wider range than when measuring the vertical measuring magnetic field, which produces only relatively small changes in the measurement signal. Accordingly, the device of the invention has a greater installation tolerance for the measuring device (s) and/or a greater tolerance with respect to measurement deviations or unevenness of the surface of the moving body. The invention is based on another observation that measuring the tangential measuring magnetic field at a greater distance than the distance of the magnetic field generating means for the moving body produces an improved useful signal.

According to an advantageous embodiment, at least one measuring device includes at least one induction coil for measuring the measuring magnetic field, which in general has a coil axis which is at least approximately perpendicular to the magnetic field of the magnetic field generating means and/or at least approximately parallel to a motion direction of the moving body.

For guiding the measuring magnetic field through the induction coil (s) or also as a carrier for the coil winding, each induction coil generally has its own magnetic flux conduction body or coil core. Moreover, at least one termination element can be arranged on the end faces of each induction coil not only for guiding the flux, but also for facilitating mounting of the coil.

According to another advantageous embodiment, the magnetic field of the magnetic field generating means pass through the electrically conducting region of the moving body in at least one spatially confined partial area or in at least two spatially confined areas that are preferably spaced apart in the motion direction.

This arrangement of the measuring device relative to this partial area can be selected in different ways.

In one embodiment, at least one measuring device is arranged so that its projection onto the moving body in a projection direction that is parallel to the magnetic field of the magnetic field generating means or perpendicular to the motion direction of the motion body is located at least partially within this partial area. Advantageously, the measuring device can be arranged in the flux path of a measuring magnetic field extending around only one magnetically energized partial area in the moving body.

In another alternative embodiment, at least one of measuring device is arranged so that its corresponding projection is essentially entirely located outside each of the partial areas of the moving body through which the magnetic field of the magnetic field generating means passes. This second embodiment is preferred if at least two spatially separated, magnetically energized partial areas are provided in the moving body and the measuring device is therefore arranged with an offset to the partial areas and in particular between the partial areas. The projection of each measuring device onto the moving body in a projection direction that is parallel to the direction of the magnetic field generating means or perpendicular to the movement direction of the moving body is then located mainly between the two partial areas in the moving body through which the magnetic field of the magnetic field generating means passes.

The projection of at least one and preferably each measuring device onto the moving body has therefore the same spacing at least in the motion direction from an edge of the partial region through which the magnetic field of the magnetic field generating means passes, i.e., the measuring device is therefore arranged in the center of the partial region or at least between two partial regions.

Preferably, one and preferably each of the measuring device is formed or arranged in the motion direction substantially symmetrical to the magnetic field generating means, meaning that the measuring device is formed or arranged essentially symmetrical to the magnetic field generating means.

The central or symmetric arrangement of the measuring device(s) has the advantage that the measuring magnetic field tangential to the motion direction is greatest in an area above and below the partial area, thereby achieving a high sensor or measurement sensitivity and/or a large useful signal. The symmetry can be further increased by forming each measuring device in the motion direction essentially symmetric to the magnetic field generating means or to a common symmetry plane oriented perpendicular to the motion direction, i.e., if an induction coil is used, in particular with respect to its effective cross-section and the number of turns as well as the employed material.

According to another embodiment of the device, the magnetic field of the magnetic field generating means is oriented in a substantially identical direction in both partial areas of the moving body, in particular perpendicular to the motion direction of the moving body. Moreover, the magnetic field is homogeneous and/or time-independent.

Typically, the magnetic field of the magnetic field generating means is oriented substantially perpendicular to motion direction in both partial areas of the moving body. The magnetic field of the magnetic field generating means, in particular with a suitable design of the magnetic flux conducting means, is at least approximately orthogonal to the tangential measuring magnetic field in the region of the measuring device(s), and is therefore not measured by the measuring device or can be filtered out. Accordingly, variations in the applied magnetic field caused by potential temperature changes are eliminated in the measurement signal of the measuring device, keeping the overall temperature drift and noise small.

In a particularly advantageous embodiment of the invention, magnetic field conducting means (or: flux collectors, magnetic flux guiding means, yoke) are associated with the magnetic field generating means for conducting the magnetic field of the magnetic field generating means, wherein the magnetic flux guiding means preferably form a closed magnetic circuit (or: magnetic flux path).

According to another advantageous embodiment, magnetic flux conducting means for conducting the measuring magnetic flux are associated in addition or alternatively with at least one measuring device, with the many flux conducting means forming at least one closed magnetic circuit.

The aforedescribed magnetic flux conducting means guide the magnetic flux of the magnetic field generating means and/or the measuring magnetic flux in a predetermined fashion. The magnetic flux conducting means can be used with the magnetic field generating means to concentrate the magnetic field, to reduce stray fields and to increase the field strength in the energized region of the reference body. Conversely, the measuring device can employ additional magnetic flux conducting means to increase the effective permeability. This can enhance the useful or measurement signal of the measuring device.

The magnetic flux conducting means for the magnetic field generating means and the magnetic flux conducting means for the measuring device(s) preferably form independent magnetic field paths. By providing separate magnetic flux conducting means for the magnetic field generating means and the flux conducting means for the measuring device(s), and separate magnetic flux conducting means for the measuring device, their functions can be optimized and different geometries and materials can be used.

Alternatively, the magnetic field generating means and the measuring device can have at least partially common magnetic flux conducting means.

It has to be observed that the eddy current losses and/or thermal noise can be kept quite low by properly selecting the maternal and configuring the magnetic flux conducting means. The magnetic flux conducting means can be made of the maternal having a low specific electric resistance and/or can have lamellar structures or slots for reducing eddy currents. The material for the magnetic flux conducting means is generally magnetically conducting and/or soft magnetic. When using separate magnetic flux conducting means for the magnetic field generating means for the measuring device, the magnetic flux conducting means for the magnetic field generating means to have preferably a greater permeability than the magnetic flux conducting means for the measuring device, because the intermediate space of the magnetic field generating means, through which the moving body moves, has to be bridged by the exciter magnetic field. In addition, the magnetic flux conducting means of the measuring device can also be formed of a material with lower eddy current losses than the material for the magnetic flux conducting means of the magnetic field generating means. For example, a material can be selected for the magnetic flux conducting means of the measuring device in the form of an iron-powder-containing material or a ferritic magnetic material. For the magnetic flux conducting means of the magnetic field generating means, an exemplary material can be soft iron with a high permeability.

In another advantageous embodiment, the magnetic flux conducting means for the magnetic field generating means guide the magnetic field of the magnetic field generating means at least approximately perpendicular to the motion direction of the moving body and/or at least in a plane that is oriented perpendicular to the motion direction of the moving body. This practicality eliminates a tangential component of the exciter field that could interfere with a tangential measurement of the measuring device.

The magnetic flux conducting means for the measuring device(s) preferably guide the measuring magnetic field in at least one plane that includes the motion direction of the moving body.

In another advantageous embodiment, the magnetic flux conducting means for the magnetic field generating means can direct the magnetic field of the magnetic field generating means into a plane which is essentially oriented perpendicular to the plane in which the magnetic flux conducting means for the measuring device conduct the measuring magnetic field. Accordingly, the magnetic field paths of the magnetic flux conducting means for the exciter field and the measurement field are orthogonal and therefore (nearly) independent of each other and practically do not to interfere with each other.

In yet another embodiment, at least one pair of measuring devices is provided which are arranged on different sides of the moving body. The two measuring devices can then be electrically connected so as to add the useful measuring signals of the two measuring devices and to at least partially compensate or eliminate the interfering signals by a common mode suppression (or differential suppression). Such interfering signals are produced in particular by changes in the distances between the measuring devices and the moving body which produce generally an interfering signal which increases with increasing rotation speed. The changes in the distance can be caused by the deviations of the moving body from a predetermined path, for example as a result of a tumbling or tilting motion. Since the measuring magnetic field on opposite sides of the moving body is generally oriented in opposite directions, the two measuring devices in this embodiment are generally connected with opposing electrical polarity.

Preferably, the two measuring devices are arranged directly opposite of each other so that their projections onto the moving body overlap, and/or the two measuring devices are essentially constructed in an identical manner. Each of these measures improves the suppression of interfering signals.

The magnetic field generating means include in general at least one pair or at least two pairs of permanent magnets that are mutually offset in the motion direction and have opposing magnetic poles (or poles of the opposite polarity), between which the moving body moves or is moveable.

In another embodiment, the magnetic field generating means and/or the magnetic flux conducting means and/or the measuring device and/or the magnetic flux conducting element and/or the termination element can be each secured to a single or to a common support and/or can be thermally coupled with the support. The support has then preferably a good thermal conductivity and can be made to in particular of a metal. The thermal coupling with the support which has preferably a good thermal conductivity, has the advantage that heat produced by eddy current losses are removed from the magnetically conducting elements, so that these can be effectively cooled.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals.

A moving body whose motion is to be measured is indicated in FIGS. 1 to 9 with the reference numeral 2. The illustrated moving bodies 2 are generally made of an electrically conducting material, for example, a metal such as copper (Cu) or aluminum (Al) or a metal alloy, such as steel. However, the embodiments are not limited to these materials.

Figure 1:
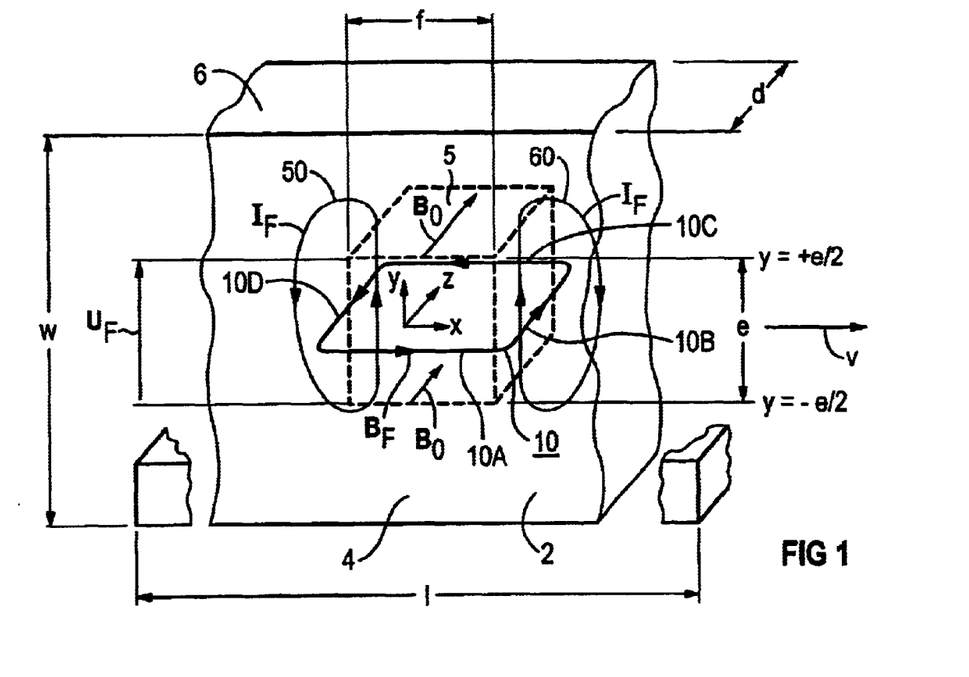
FIG. 1 is a perspective view of a moving body in a translational motion through a magnetic field.

In the embodiment according to FIG. 1, the moving body 2 moves in a Cartesian x-y-z-coordinate system with a vector velocity v in a straight line in the direction of the depicted arrow along the x-direction. A time-independent (or DC) magnetic field $B_0$ which extends in the z-direction and is perpendicular to the velocity vector v and perpendicular to a substantially flat surface 4 of the moving body 2, passes through the moving body 2 in a spatially confined partial area 5, for example in form of a cuboid or parallelepiped. In an outer partial area 6 surrounding the partial area 5, the moving body 2 is free of the external magnetic field $B_0$. The transverse dimensions of the moving body in the y-direction are indicated with w and of the partial area 5 penetrated by the magnetic field $B_0$ with e, and the corresponding end faces of the partial area 5 in the y-direction are indicated with $-e/2$ and $+e/2$. The longitudinal dimensions of the moving body 2 in the x-direction are indicated with l and of the partial area 5 with f. The thickness or dimension of the moving body 2 in the z-direction is indicated with d.

The partial area 5 penetrated by the magnetic DC field $B_0$ traverses the moving body 2 with the velocity $-v$. This motion causes a temporal change in the magnetic flux, so that an electric voltage UF is induced in the y-direction in the partial area 5 penetrated by the magnetic field $B_0$ and a corresponding electric current $I_F$ of charge carriers in the electrically conducting moving body 2. The flux lines of the current $I_F$ which is sometimes also referred to as Ferrariscurrent, extend within the partial area 5 penetrated by the magnetic field $B_0$ at least approximately as straight lines between the two end lines $y=-w/2$ and $w=+w/2$ in the y-direction and close via the outer partial region 6 that is not penetrated by the magnetic field $B_0$. This causes current loops or eddy currents 50 and 60 with an opposite orientation of the current flow, as viewed in the x-direction, before and after the partial region 5.

Each current eddy 50 and 60 or the entire current field $I_F$ generates a magnetic flux density or magnetic induction in form of a measuring magnetic field $B_F$, which is sometimes also referred to as Ferraris measuring field or Ferraris induction field. An exemplary eddy of this measuring magnetic field $B_F$ is illustrated and includes two vertical flux paths 10B and 10D which extend through the current eddies 50 and 60 in opposite directions in the z-direction as well as two tangential flux paths 10A and 10C extending essentially parallel to the xy-plane, also with an opposite orientation. It is therefore approximately $$|B_F| \sim |I_F| \sim |v \times B_0|/\rho \qquad (1)$$

wherein "~" indicates "proportional to", | | "the absolute value of", "x" a vector or cross product, and $\rho$ the specific electrical resistance of the moving body 2.

According to the invention, the measuring magnetic field $B_F$ is measured in the flux path 10A and/or 10C extending tangentially to the moving body 2. For this purpose, an induction coil or detection coil or another measuring device (not shown in FIG. 1) is arranged tangentially on at least one side of the moving body 2.

Figure 2:
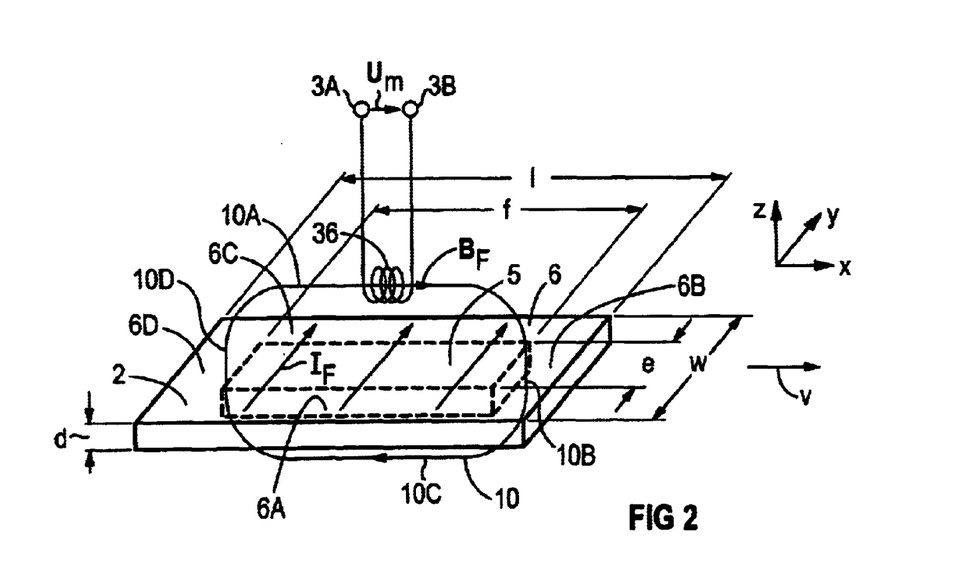
FIG. 2 shows a perspective view of a device for measuring a motion of a moving body moving through a magnetic field with a tangentially arranged induction coil.

FIG. 2 shows an embodiment with such a tangentially arranged detecting induction coil 36 in a modified geometry of the partial area 5. The magnetically energized partial area 5 in the moving body 2 extends preferably in the motion direction, i.e., along the motion trajectory. The length f of the partial area 5, i.e., the dimension measured in the motion direction or x-direction, is greater than the lateral dimensions measured transversely thereto, in particular the width e in the y-direction. In general, the ratio f/e is >3, in particular f/e >5 and preferably f/e >10.

The partial area 5 penetrated by the magnetic field $B_0$ in FIG. 2 is located entirely within the electrically conducting moving body 2 and is surrounded by the outer partial area 6 that is not penetrated by the magnetic field $B_0$. Therefore, as seen in the x-direction, the front area of the partial area 6 is indicated with 6B, the right area with 6A, the left area with 6C, and the rear area with 6D. The motion of the moving body 2 induces electrical currents $I_F$ which flow through the partial region 5 essentially in the y-direction and close only via the front and rear areas 6B and 6D which are on the average relatively far away. As a result, a tangential measuring magnetic field $B_F$ that extends essentially parallel to the surface 4 of the moving body 2 can be detected in a central area of the partial area 5 over a large area of its length f. Two tangential flux paths are again indicated with the reference numerals 10A and 10C. The generation of eddy currents is reduced.

The induction coil 36 is arranged in the tangential flux path 10A of the measuring magnetic field $B_F$. The coil axis A of the cylindrical induction coil 36 is oriented parallel to the surface 4 of the moving body 2 and to the motion direction of the moving body 2 in the x-direction. The tangential flux path 10A hence extends essentially along the coil axis A through the induction coil 36.

The measuring magnetic field $B_F$ induces in the induction coil 36 an electrical measurement voltage $U_m$ which is proportional to the time derivative or change $d|B_F|/dt$ of the measuring magnetic field $B_F$ and can be tapped at two terminals 3A and 3B of the induction coil 36. The absolute value of the measurement voltage of the induction coil then becomes $$U_m \sim dv_x/dt \qquad (2)$$

The induction coil 36 is arranged directly above the partial area 5 so that the orthogonal geometric projection of the induction coil 36 in the z-direction is located inside the partial area 5. With such an arrangement, a relatively high magnetic field strength is measured for the tangential measuring magnetic field $B_F$ in the region of the flux path 10A, providing a comparatively high measurement sensitivity. Since the field strength of the tangential measuring magnetic field $B_F$ (tangential field) in the flux paths 10A and 10C above and below the partial area 5, as seen in the x-direction or motion direction, is greatest in the center, the induction coiled 36 is arranged advantageously in the x-direction in the center of the partial area 5, so that the projection has the same distance on all sides in the x-direction to the edge of the partial area 5, or has a common symmetry plane or a symmetry axis with the partial area 5.

Figure 3:
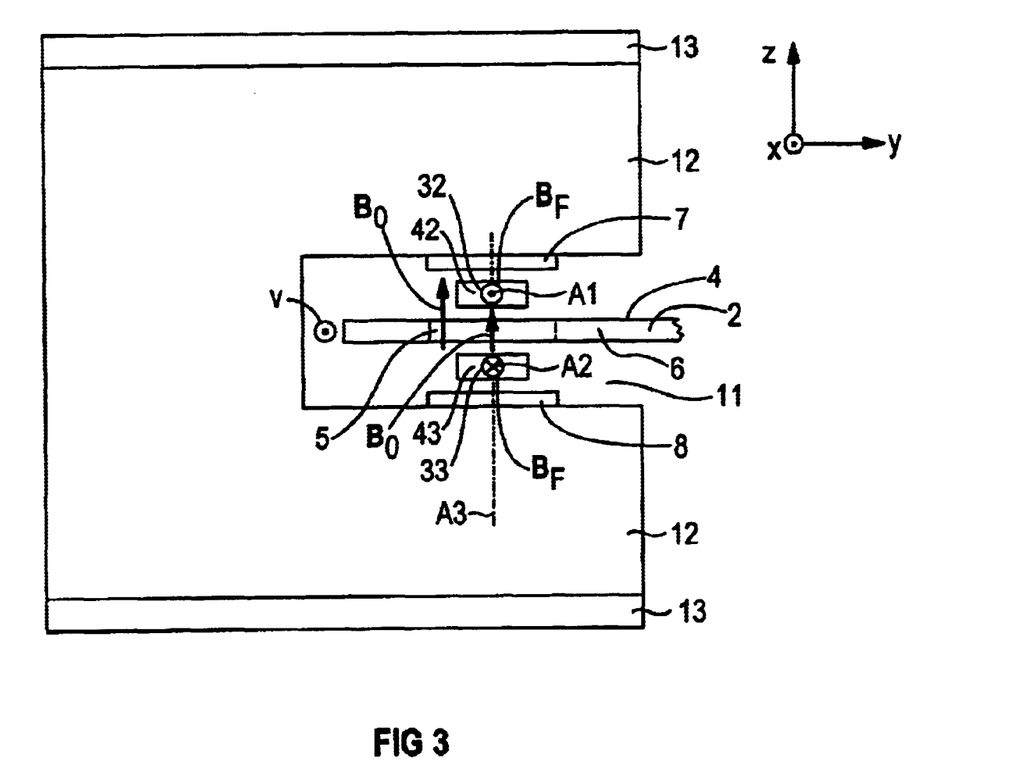
FIG. 3 is a device for measuring a motion of a moving body with a U-shaped yoke and two permanent magnets as well as two induction coils in a cross-section perpendicular to the motion direction.

FIG. 3 shows another embodiment of a motion detection device. A U-shaped, magnetically conducting yoke 12 is provided which includes or surrounds a gap (air gap) 11. Two plate- or disk-shaped permanent magnets 7 and 8 are arranged on both legs of the U-shaped yoke 12 on both sides of the gap 11 with opposing magnetic poles. The moving body 2 passes through the gap 11 between the two permanent magnets 7 and 8. The partial area 5 located in the gap 11 of the moving body 2 is penetrated by the essentially homogeneous unidirectional magnetic field $B_0$ of the two permanent magnets 7 and 8. This magnetic field $B_0$ produces in the moving body 2, which moves with the velocity v perpendicular to the drawing plane, eddy currents which induce a measuring magnetic field $B_F$ in the opposite direction. The respective directions and orientations of the magnetic fields $B_0$ and the $B_F$ are indicated with arrows. The two permanent magnets 7 and 8 are magnetically short-circuited via the yoke 12 on the side facing away from the gap 11. The magnetic field $B_0$ is thereby closed outside the gap 11 via the yoke 12, thereby practically eliminating stray fields and an associated loss of sensitivity. The yoke 12 is mounted on both sides on a support body 13 which can be an angle profile or a U-shaped sheet metal support.

In addition, two induction coils 32 and 33 are arranged in the gap 11 of opposite sides of the moving body 2 between the permanent magnets 7 and 8. The center axis or coil axis of the induction coil 32 wound around a core 42 is indicated by A1, the coil axis of the induction coil 33 wound around a core 43 by A1, and a center axis of the permanent magnets 7 and 8 that is oriented perpendicular to the surface 4 or to the motion direction of the moving body 2, is indicated by A3. The coil axes A1 and A2 of the induction coils 32 and 33 are essentially parallel to each other and parallel to the motion direction (or tangential to the motion trajectory) as well as perpendicular to the center axis A3 and the magnetic field $B_0$.

Each of the two induction coils 32 and 33 measures the respective measuring magnetic field $B_F$ produced by the eddy currents (corresponding to the opposing current eddies 50 and 60 of FIG. 1) which at the positions of the induction coils 32 and 33 extends tangentially to the motion direction and to the surface 4 of the moving body 2. Since the directions of the measuring magnetic field $B_F$ oppose each other in the region above the partial area 5 and in the region below the partial region 5, the corresponding winding direction or orientation of the two induction coils 32 and 33 are interchanged. The two induction coils 32 and 33 are electrically connected in series, so that their measurement voltages are added. Advantageously, the interfering voltages in the two measurement coils 32 and 33 are subtracted and therefore compensate each other. Alternatively, the two induction coils 32 and 33 can also have the same winding direction, in which case they are connected differentially and read out by a difference amplifier.

Figure 4:
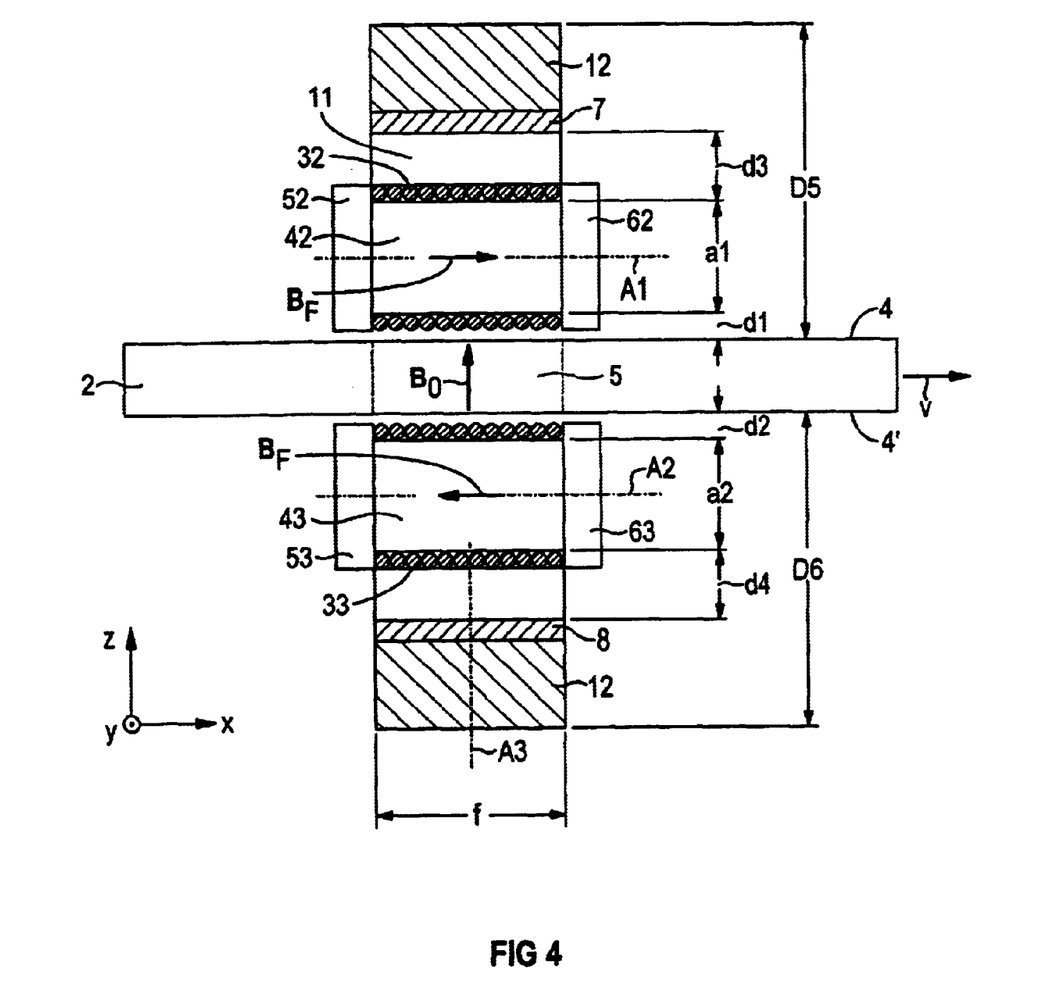
FIG. 4 is a device for measuring a motion of a moving body with two induction coils arranged between two permanent magnets and the moving body in a longitudinal section that includes the motion direction.

FIG. 4 shows another embodiment of a device for measuring a motion of the moving body 2 with two induction coils 32 and 33 arranged on opposite sides of the moving body 2. The vertical interior extent of the induction coil 32 in the z-direction perpendicular to the center axis A1 (or interior dimension, diameter) is referenced by a1 and the corresponding interior dimension of induction coil 33 about its center axis A2 in the z-direction is indicated by a2. The distances between the induction coils 32 and 33 in the z-direction from the moving body 2 are indicated by d1 and d2, respectively, which are preferably identical, i.e., d1=d2. Also, the distance from the permanent magnet 7 in the direction of the induction coil 32 is indicated with d3 and the distance between the induction coil 33 and the permanent magnet 8 is indicated by d4. The distances are preferably identical, i.e. d3=d4. The interior dimensions a1 and the a2 of induction coils 32 and 33 are preferably greater than the sum of the distances (d1+d3) and (d2+d4), respectively. The dimensions of the gap 11 between the moving body 2 and the permanent magnets 7 or 8 in the z-direction correspond to the sum (d1+a1+d3) and (d2+a2+d4), respectively.

The width of the yoke 12 in the motion direction (x-direction) is identical to that of the two permanent magnets 7 and 8, with the yoke being flush with the permanent magnets. The common dimension of the permanent magnets 7 and 8 and the yoke 12 in the x-direction is indicated by f. The induction coils 32 and 33 are also inserted flush into the yoke 12 so that the length of each of the induction coils 32 and 33 measured in the x-direction or axially to the coil axis A1 or A2 is identical to the dimension f.

As a result, each of the induction coils 32 and 33 is penetrated by the magnetic field $B_0$ of the permanent magnets 7 and 8. However, the applied magnetic field $B_0$ is always perpendicular (or orthogonal) to the coil axis A1 or A2 and is therefore not measured by the induction coils 32 and 33. Any variations in the applied magnetic field $B_0$ caused by a temperature drift therefore also do not interfere with the measurement signal, which reduces the drift and the overall noise in the detection device. The field strength of the magnetic field $B_0$ is typically adapted to the overload or saturation limit of the soft magnetic cores 42 and 43.

The height of the yoke 12, as measured in the z-direction starting from the moving body 2, is indicated on the different sides with D5 and the D6, which are preferably identical, i.e. D5=D6. Preferably, the height D5 and D6 of the yoke 12 and hence also the height of the actual sensor head is greater than the width f. The high and narrow design of the yoke advantageously produces a comparatively high effective permeability and a comparatively high useful signal.

According to FIG. 4, each of the cores 42 and 43 of the two induction coils 32 and 33 is provided on both ends with two termination elements 52 and 62, and 53 and 63, respectively. The cores 42 and 43 as well as the termination elements 52, 53, 62 and 63 are preferably rotationally symmetric about the center axes A1 and/or A2, for example cylindrical, or at least rotationally symmetric with a predetermined multiplicity or mirror symmetric to a symmetry plane extending through the center axis A1 or A2, for example in a four-sided or polygonal shape. The cores 42 and 43 can also be formed as a single piece with the corresponding termination elements 52 and 62, and 53 and 63, respectively. Each unit with the induction coil 32 or 33, coil core 42 or 43, and termination elements 52 and 62, or 53 and 63, is secured to the yoke 12, for example with screws, or supported by the yoke.

In the embodiments depicted in FIGS. 3 and 4, the gap 11 should be configured to be quite large, because the tangential component of the measuring magnetic field $B_F$ can only be measured relatively far away from the moving body 2. The magnetic field $B_0$ applied between the permanent magnets 7 and 8 is relatively small with the large separation between the permanent magnets 7 and 8 due to demagnetization.

It is proposed according to the invention, to arrange the induction coils 32 and 33 and/or in general the measuring device for measuring the measuring magnetic field $B_F$ outside or farther away from the moving body 2 than the permanent magnets 7 and 8.

Figure 5:
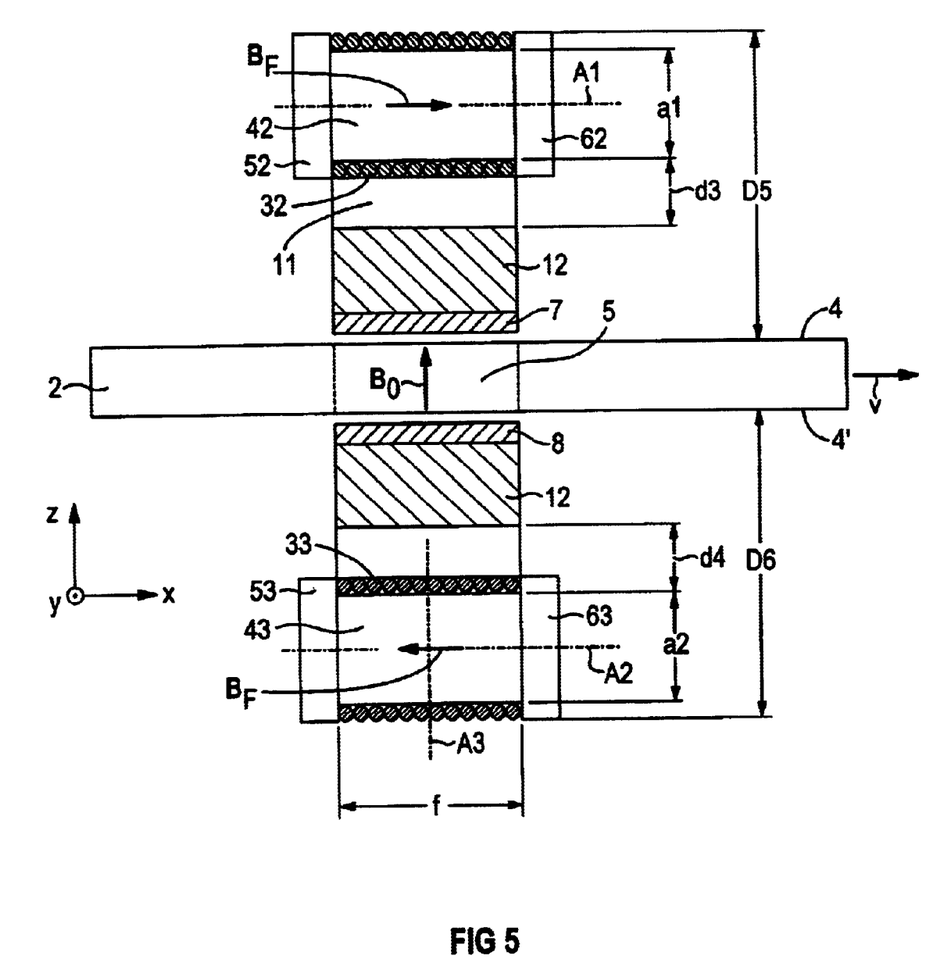
FIG. 5 shows a device for measuring a motion of a moving body with two tangentially arranged induction coils and two permanent magnets between the induction coils and the moving body in a longitudinal section that includes the motion direction.

FIG. 5 shows a motion measuring device implemented according to this aspect of the invention. Unlike FIG. 4, the arrangement of, on one hand, the induction coils (or detection coils) 32 and 33 with the corresponding cores 42 and 43 and the termination elements 52 and 62 as well as 53 and 63 and, on the other hand, the associated permanent magnets 7 and 8 is switched around. The permanent magnets 7 and 8 are now closer to the moving body 2 than the induction coils 32 and 33.

In this way, the exciter field (or magnetic field) $B_0$ is sufficiently strong in the partial area 5, and the measuring magnetic field $B_F$ can be measured at a location where it has an optimal useful signal. Another reason for this arrangement is that the changes in the tangential component of the measuring magnetic field $B_F$ with the distance from the moving body 2 in the z-direction are relatively small. The measuring magnetic field $B_F$ is relatively homogeneous, in particular from a predetermined minimum distance from the moving body 2, which provides a relatively large installation tolerance of this measurement arrangement. In FIG. 5, a particular compact construction is selected by the flush arrangement of the induction coils 32 and 33 and the permanent magnets 7 and 8 as well as the yoke 12 in the x-direction.

Figure 6:
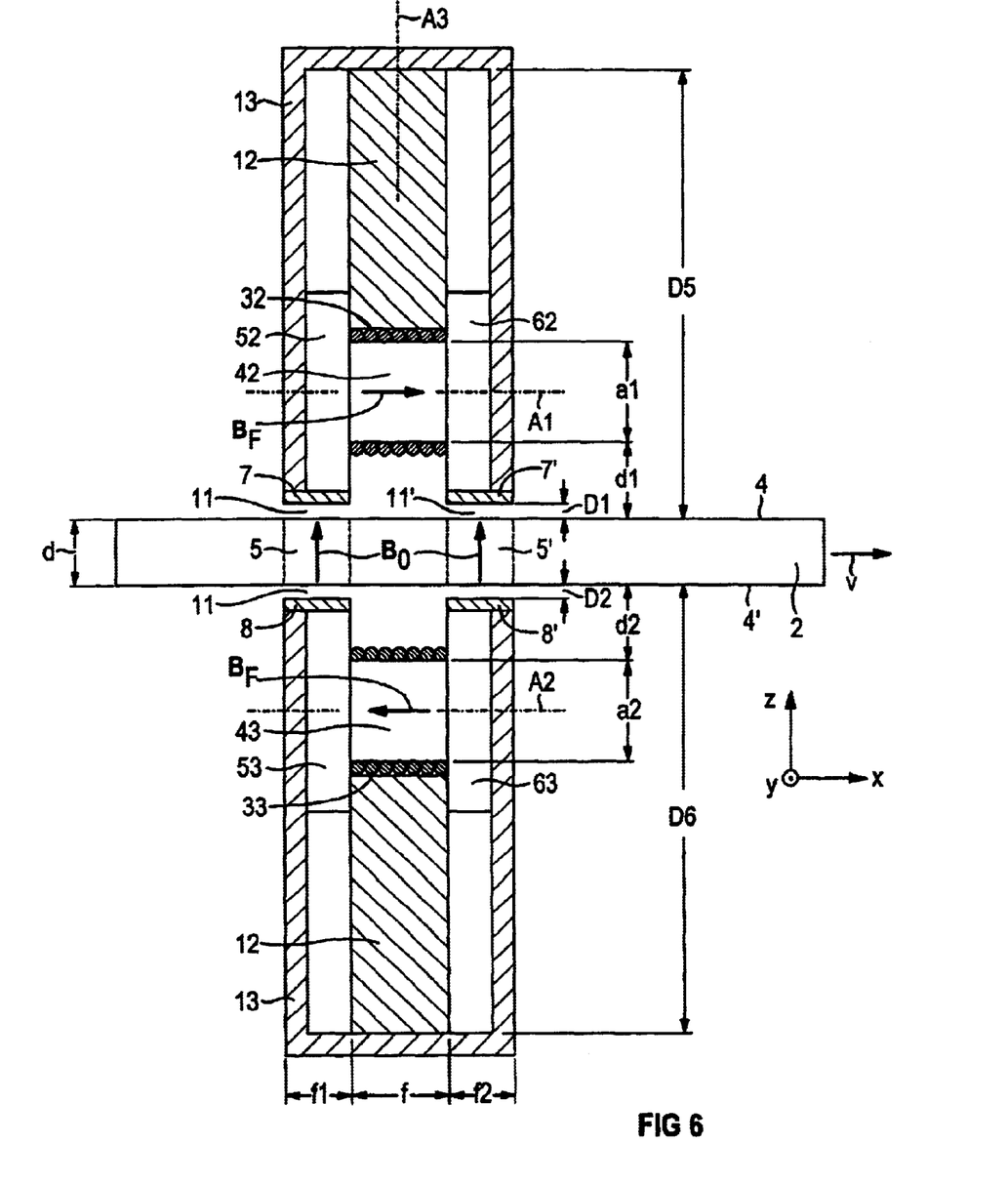
FIG. 6 shows a device for measuring a motion of a moving body with two tangentially arranged induction coils and four permanent magnets between the induction coils and the moving body in a longitudinal section that includes the motion direction.

According to FIGS. 3, 5 and 6, the yoke 12 is attached on the side facing away from the moving body 2 to a support (or a mounting element) 13, in particular with a screw connection. The support 13 is made preferably of a heat-conducting material, such as a metal, and/or can have a U- or L-shaped form. When the yoke 12 has a U-shaped form, as depicted in FIG. 3, the yoke 12 can be attached on at least two sides or all the way around to the support 13. The support 13 made of the heat-conducting material effectively cools both the induction coils 32 and 33 and the yoke 12, and thereby also the permanent magnets 7 and 8 connected with the yoke 12. This heat removal further decreases the temperature drift and noise.

In FIG. 6, the support 13 surrounds the yoke 12 like a housing. The termination elements 52, 53 and 62, 63 of the induction coils 32, 33 are arranged between the yoke 12 and the support 13, whereas the cores 42 and 43 and induction coils 32 and 33 are arranged in the yoke 12. Two pairs of permanent magnets 7 and 8, and 7' and 8', which are offset in the motion direction defined by the velocity v, are arranged on the inside of the support 13 facing the moving body 2, with corresponding gaps 11 and 11' formed for the moving body 2 between each of the permanent magnets.

The dimensions of the gaps 11 and 11' in the z-direction between the moving body 2 and the permanent magnets 7 and 7', and 8 and 8' are identical and have the reference numeral D1 and D2. The distances d1 and d2 of the induction coils 32 and 33 from the moving body 2 in the z-direction are greater than the distances D1 and D2 of the permanent magnets 7 and 8, and 7' and 8', from the moving body 2, i.e., the induction coils 32 and 33 are located farther outside than the permanent magnets 7 and 8, and 7' and 8'. The coil axes A1 and A2 of the two induction coils 32 and 33 are oriented tangentially, i.e., parallel to the motion direction, whereas the magnetic field $B_0$ of the permanent magnets 7 and 8, and 7' and 8' is perpendicular to the motion direction. The x-dimensions of the permanent magnets 7 and 8 and therefore the partial area 5 in the moving body 2 penetrated by the magnetic field $B_0$ are identical and designated with f1. Preferably, the dimensions f1 and f2 are identical and the permanent magnets as well as the induction coils 32 and 33 are arranged mirror-symmetrically to the y-z-plane, i.e., to a symmetry plane extending through the center axis A3 of the yoke 12 and perpendicular to the motion direction. The induction coils 32 and 33 are located entirely within the two permanent magnet pairs 7 and 8, and 7' and 8', so that the orthogonal projection of the induction coils 32 and 33 onto the moving body 2 is located between the two partial areas 5 and 5'. The corresponding dimensions in the x-direction of the induction coils 32 and 33 and the yoke 12 are designated with f. The dimensions f1 and f2 correspond to the sum of the dimensions in the x-direction of the support 13 and the termination elements 52 and 53, and/or 62 and 63, in the x-direction.

The yoke 12 as well as the magnetically conducting termination elements 52, 53, and 62 and 63 conducts the magnetic flux of the magnetic field $B_0$ in an essentially closed magnetic circuit along a direction that is substantially perpendicular to the motion direction. The induction coils 32 and 33 are located substantially outside this magnetic circuit and are therefore not significantly penetrated by the magnetic field $B_0$. For conducting the magnetic flux, the support 13 can also be configured to be magnetically conductive.

The symmetric arrangement of the induction coils 32 and 33 with respect to the center axis A3 of the permanent magnets 7 and 8 according to FIG. 3, 4, 5 or 6 has the advantage that the measuring magnetic field $B_F$ in the direction tangential to the motion direction (tangential field) is greatest in the center above and below the partial area 5, as seen in the x-direction, so that a high sensor sensitivity or measurement sensitivity can be achieved. Since the field strength of the measuring magnetic field $B_F$ decreases relatively slowly outwardly in the z-direction, relatively large installation tolerances can be obtained.

Figure 7:
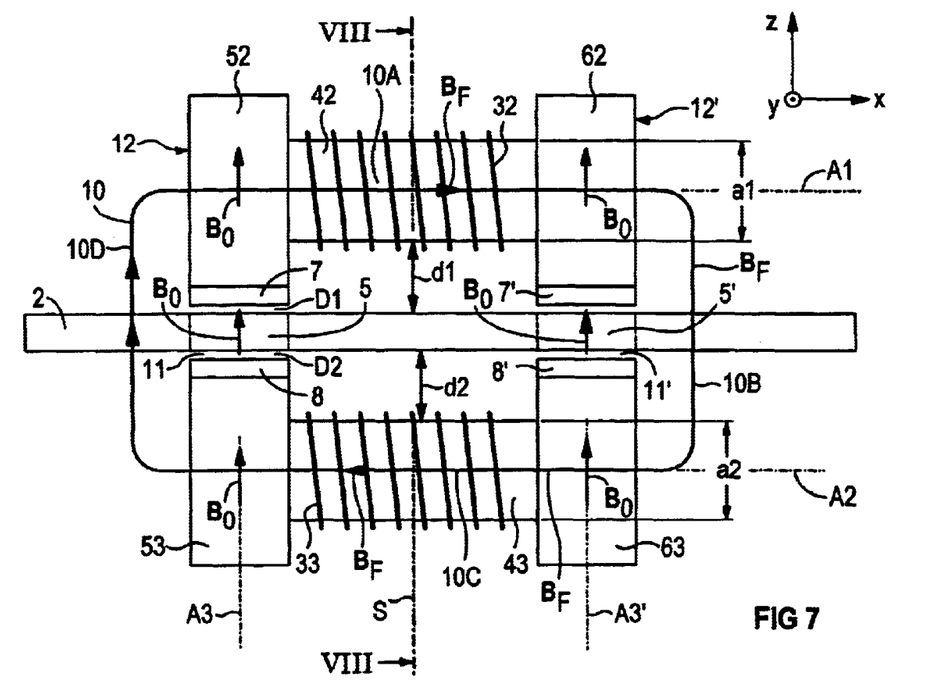
FIG. 7 shows a device for measuring a motion of a moving body with two pairs of permanent magnets and two tangentially arranged induction coils with associated magnetic flux conducting means in a longitudinal section that includes the motion direction.
Figure 8:
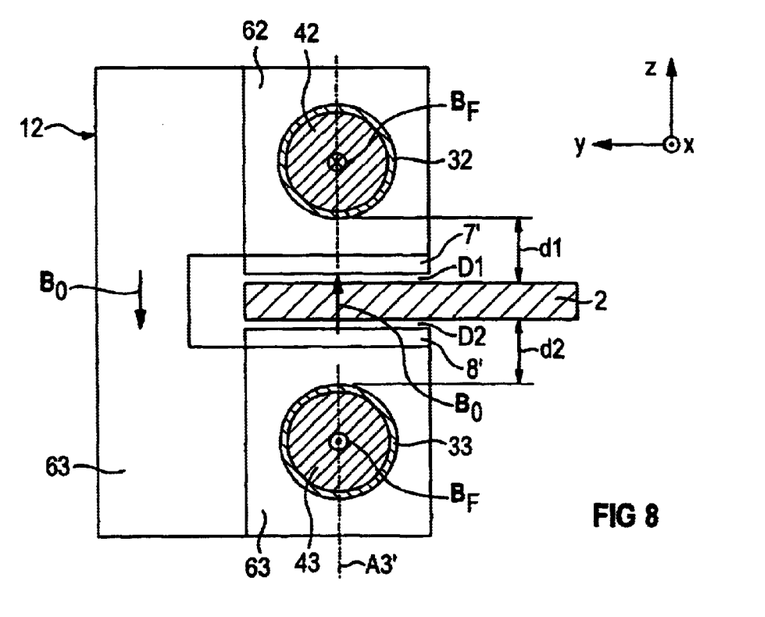
FIG. 8 shows the device of FIG. 7 in a cross-section perpendicular to the motion direction.

FIGS. 7 and 8 show in two different cross-sectional views a particularly advantageous embodiment of the device for measuring a motion of a moving body 2. FIG. 8 corresponds to the section along the line VIII—VIII in FIG. 7, as indicated by arrows. The induction coils 32 and 33 are again arranged on cores 42 and 43 having coil axes A1 and A2 oriented essentially parallel to the motion direction of the moving body 2. The distances of the effective inside surfaces of the cross-sectional areas of the coils 32 and 33 that are effective as sensors from the moving body 2 are again designated with the reference numerals d1 and d2 and essentially constant as well as preferably also identical. Termination elements 52 and 62, and 53 and 63, respectively, are again arranged on the end faces of the coil cores 42 and 43 of the two induction coils 32 and 33 in the motion direction. The insides of the two opposing termination elements 52 and 53 are flush with the permanent magnets 7 and 8, and the termination elements 62 and 63 are flush with the permanent magnets 7' and 8'. The two termination elements 52 and 53 are magnetically connected by a U-shaped yoke 12, whereas the two termination elements 62 and 63 are magnetically connected by another U-shaped yoke 12'. The termination elements 52 and 53 together with the corresponding yoke 12 form a magnetic circuit that conducts a magnetic field $B_0$ of the two permanent magnets 7 and 8, whereas the termination elements 62 and 63 together with the corresponding yoke 12' form a magnetic circuit that conducts a magnetic field $B_0$ of the two permanent magnets 7' and 8'. Both magnetic circuits (or magnetic flux conducting means) for the magnetic field $B_0$ extend essentially in a plane that contains the axes A3 and A3' of the termination elements 52 and 53, and 62 and 63, respectively, extending in the z-direction and is oriented perpendicular to the motion direction (x-direction), so that the magnetic field $B_0$ is everywhere oriented essentially perpendicular to the motion direction.

The magnetic circuit formed by the termination elements 52, 53, 62 and 63 as well as by the interposed cores 42 and 43 guides the measuring magnetic field $B_F$ in a plane oriented perpendicular to these two planes of the magnetic flux conduction means through the magnetic field $B_0$. The orthogonal arrangement of the magnetic flux conduction means for the magnetic field $B_0$ of the magnetic field generation means 7, 7', 8, and 8', on one hand, and the measuring magnetic field $B_F$, on the other hand, makes the exciter system for generating the induction currents in the moving body 2 independent of the detection system for measuring the induced magnetic fields. The illustrated magnetic circuits have an essentially ring-shaped form with a rectangular cross-section, but also can have a curved shape. The distances of the induction coils 32 and 33 from the moving body 2 are greater than the spacing D1 and D2 between the permanent magnets 7 and 8, or 7' and 8'. The ratio d1/D1 or d2/D2 is preferably in a range between 10 and 20. The values for D1 and D2 are typically between 0.5 mm and 2 mm, for d1 and d2 between 5 mm and 20 mm.

Figure 9:
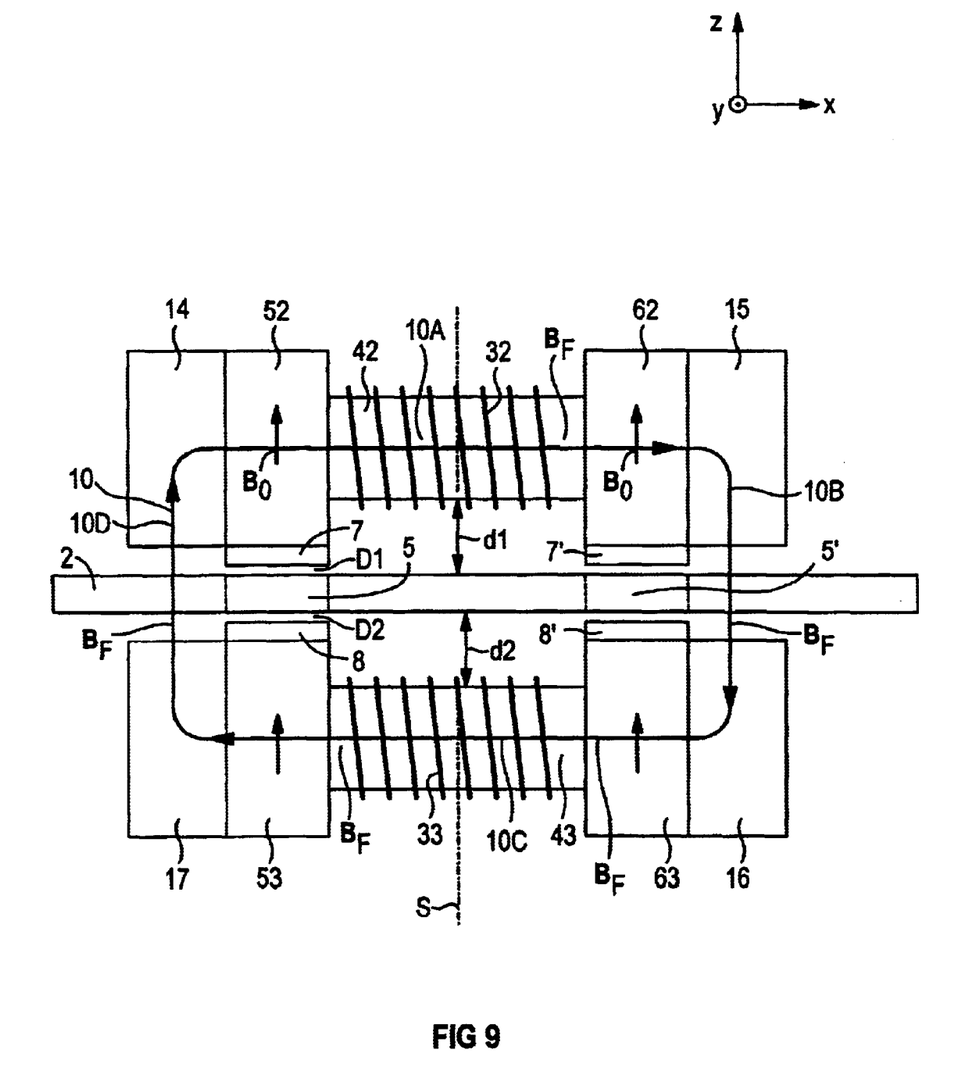
FIG. 9 shows an additional embodiment of the device according to FIG. 7 with additional magnetic flux conducting elements for conducting the magnetic field in a longitudinal section that includes the motion direction.

FIG. 9 shows another embodiment wherein, in addition to the embodiment of FIG. 7, additional magnetic flux conducting elements 14, 15, 16 and 17 are arranged on the outside of the termination elements 52, 62, 63 and 53, as seen in the motion direction. The magnetic flux conducting element 14 is arranged on the termination element 52 facing away from the core 42, the magnetic flux conducting element 15 is arranged on the termination element 62 facing away from the core, the magnetic flux conducting element 16 is arranged on the termination element 63 facing away from the core 43, and the fourth magnetic flux conducting element 17 is arranged on the termination element 53 facing away from the core 43. Each magnetic flux conducting element 14 to 17 is made of a magnetically conducting material. The magnetic flux conducting elements 14 and 17 are arranged in an opposing disposition directly in the partial area 5 in the moving body 2 penetrated by the magnetic field $B_0$ and thereby guide the measuring magnetic field $B_F$ generated therein or absorb the same. These additional magnetic flux conducting elements operate to decouple the measuring magnetic flux and are arranged so that a closed undisturbed magnetic flux eddy 10 is guided over the magnetically conducting components formed by the magnetic flux conducting elements 14 to 17, the termination elements 52, 53, 62 and 63, and the coil cores 42 and 43. The opposing magnetic flux conducting elements 14 and 17, and/or 15 and 16, are each arranged on the outside of the partial areas 5 and 5' in the moving body 2 penetrated by the magnetic field, so that the measuring magnetic field $B_F$ is captured in the antiparallel branches 10B and 10D of the eddy 10.

Commercially available materials, in particular materials with a high-energy product, for example Sm—Co or Nd—Fe—B alloys, can be used as materials for the permanent magnets 7 and 8, and 7' and 8'. The materials for the magnetically conducting components are preferably materials with small eddy current losses, optionally with additional features, such as lamellae or slots, to suppress or at least reduce eddy currents. Because the magnetic flux of the measuring magnetic field $B_F$ and of the exciter magnetic field $B_0$ are guided independently, different materials can be used, on one hand, for the magnetic flux conducting elements for the magnetic field $B_0$, in particular the termination elements 52 and 53 and the yoke 12 as well as the termination elements 62 and 63 and the yoke 12' and, on the other hand, for the magnetic flux conducting elements for the measuring magnetic field $B_F$, in particular the cores 42 and 43 as well as the magnetic flux conducting elements 14 to 17. For example, the magnetic flux conducting elements for the magnetic field $B_0$ can be made of materials with a high permeability, for example soft iron, which is particularly suited for bridging large air gaps, such as the gap 11, due to its large magnetic permeability. However, soft iron has relatively high eddy current losses and causes thermal noise due to its relatively high electrical conductivity. Materials that cause less noise can be used for the magnetic field conducting elements for the measuring magnetic field $B_F$, in particular metal powders, for example iron powder, or ferritic materials.

Both in the embodiment according to FIGS. 7 and 8 as well as in the embodiment according to FIG. 9, the termination elements 52, 53 and 62 and 63 serve a dual function: they guide both the magnetic field $B_0$ and the measuring magnetic field $B_F$. The magnetic flux conducting elements 14 to 17 can also be configured with corresponding termination elements 52, 62, 63 and 53 either as a single piece or with a common connected body.

The embodiment according to FIGS. 7 and 9 are practically mirror-symmetric to a symmetry plane S that is perpendicular to the motion direction or x-direction. The two induction coils 32 and 33 are preferably identical and have the same distance d1=d2 from the moving body 2. The induction coils 32 and 33 need not necessarily be arranged in the center relative to the outwardly extending inner sides of the termination elements 52, 53, 62 and 63. The distances d1 and d2 of the induction coils 32 and 33 can also be varied without changing the position of the termination elements 52, 53 and 62 and 63. Advantageously, the measuring magnetic field $B_F$ is guided in an essentially tangential direction following the flux path 10A above the moving body 2 and the flux path 10C below the moving body 2. Likewise, the measurement magnetic field $B_F$ is essentially guided vertically along the flux paths 10B and 10D. The inside dimensions a1 and a2 of the induction coils 32 and 33, which essentially correspond to the outside dimensions of the corresponding coil cores 42 and 43, are preferably selected to be no greater than the dimensions in the z-direction of the termination elements 52, 53 and 62 and 63.

The devices according to one of the FIGS. 2 to 9 can be used not only to measure a linear motion, but also to measure a rotary motion of a moving body 2 which rotates about a rotation axis, whereby the exemplary moving body 2 it then formed rotationally symmetrical about the rotation axis, in particular in the form of a ring or a flat disk. In this case, the measurement voltage $U_m$ of the induction coil(s) is $$U_m \sim d\omega/dt, \quad (3)$$

wherein $\omega$ is the rotation speed $\omega=dp/dt*e_z$, with $e_z$ representing the unit vector in the z-direction.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A device for measuring a motion of a moving body, which has at least one electrically conductive region, comprising:

magnetic field generating means for producing a primary magnetic field extending perpendicular to the motion of the moving body, with the motion of the moving body inducing an electrical current in the at least one electrically conductive region, and at least one measuring device for measuring a measuring magnetic field induced by the electrical current in the at least one electrically conductive region, said measuring magnetic field representing at least one motion parameter of the moving body, wherein the primary magnetic field passes through the at least one measuring device, which is located farther away from the moving body than the magnetic field generating means, and the at least one measuring device measures the measuring magnetic field at a location where the measuring magnetic field extends at least approximately parallel to the motion direction.

2. The device of claim 1, wherein the primary magnetic field penetrates the at least one electrically conducting region of the moving body in at least one spatially confined partial area.

3. The device of claim 1, wherein the primary magnetic field penetrates the at least one electrically conducting region in at least two spatially separated partial areas which are spaced apart in the motion direction.

4. The device of claim 3, wherein a projection of the measuring device onto the moving body in a projection direction parallel to the primary magnetic field or perpendicular to the motion direction of the moving body is located in the moving body between the at least two partial areas.

5. The device of claim 3, wherein the primary magnetic field in the at least two partial areas of the moving body is substantially oriented in an identical direction and perpendicular to the motion direction of the moving body.

6. The device of claim 2, wherein a projection of the at least one measuring device onto the moving body in a projection direction parallel to the primary magnetic field or perpendicular to the motion direction of the moving body is located at least partially inside the at least one spatially confined partial area.

7. The device of claim 2, wherein a projection of the at least one measuring device onto the moving body in a projection direction parallel to the primary magnetic field or perpendicular to the motion direction of the moving body is located substantially outside the at least one spatially confined partial area.

8. The device of claim 6, wherein a projection of each measuring device in the motion direction has essentially the same distance from an edge of the at least one spatially confined partial area.

9. The device of claim 1, and further comprising first magnetic flux conducting means associated with the magnetic field generating means for conducting the primary magnetic field, said first magnetic flux conducting means forming a closed magnetic circuit.

10. The device of claim 9, wherein the magnetic flux conducting means conduct the primary magnetic field in a plane that is oriented approximately perpendicular to the motion direction of the moving body.

11. The device of claim 1, and further comprising second magnetic flux conducting means associated with the at least one measuring device for conducting the measuring magnetic field, said second magnetic flux conducting means forming a closed magnetic circuit.

12. The device of claim 11, wherein the second magnetic flux conducting means conduct the measuring magnetic field in at least one plane that includes the motion direction of the moving body.

13. The device of claim 9, and further comprising second magnetic flux conducting means associated with the at least one measuring device for conducting the measuring magnetic field, said second magnetic flux conducting means forming a closed magnetic circuit.

14. The device of claim 13, wherein the first magnetic flux conducting means conduct the primary magnetic field in at least one first plane, and the second magnetic flux conducting means conduct the measuring magnetic field in at least one second plane oriented essentially perpendicular to the at least one first plane.

15. The device of claim 13, wherein the first magnetic flux conducting means and the second magnetic flux conducting means are separate of each other.

16. The device of claim 13, wherein the first magnetic flux conducting means and the second magnetic flux conducting means include common flux conducting elements.

17. The device of claim 13, wherein the first and second flux conducting means comprise at least one of a magnetically conducting material and a soft magnetic material.

18. The device of claim 13, wherein the first and second magnetic flux conducting means have at least one of a high electrical conductivity and small eddy current losses and a low noise.

19. The device of claim 13, wherein the first magnetic flux conducting means have at least one of a greater magnetic permeability and higher eddy current losses than the second magnetic flux conducting means.

20. The device of claim 11, wherein the second magnetic flux conducting means are made of a material selected from the group consisting of iron powder and a ferritic magnetic material.

21. The device of claim 9, wherein the first magnetic flux conducting means comprise soft iron.

22. The device of claim 1, wherein the at least one measuring device includes at least one induction coil for measuring the measuring magnetic field.

23. The device of claim 22, wherein a coil axis of the at least one induction coil is arranged approximately perpendicular to the primary magnetic field.

24. The device of claim 22, wherein a coil axis of the at least one induction coil is arranged approximately parallel to the motion direction of the moving body.

25. The device of claim 22, wherein each induction coil surrounds a corresponding second magnetic flux conducting means.

26. The device of claim 22, wherein each induction coil comprises end faces and at least one termination element arranged of the end faces.

27. The device of claim 1 comprising at least two measuring devices, which are arranged on different sides of the moving body.

28. The device of claim 27, wherein projections of the at least two measuring devices onto the moving body in a projection direction parallel to the primary magnetic field and in a projection direction perpendicular to the motion direction of the moving body are essentially identical.

29. The device of claim 27, wherein the at least two measuring devices are configured to be essentially identical.

30. The device of claim 27, wherein each measuring device is arranged essentially symmetrical to a common symmetry plane extending perpendicular to the motion direction.

31. The device of claim 1, wherein the magnetic field generating means comprise at least one pair of permanent magnets having opposite magnetic poles facing each other, with the moving body moving between the opposite magnetic poles.

32. The device of claim 1, wherein the magnetic field generating means comprise at least two pairs of permanent magnets that are arranged with a mutual offset in the motion direction.

33. The device of claim 13, and further comprising a support, wherein at least one element selected from the group consisting of the magnetic field generating means, the first magnetic flux conducting means, the second magnetic flux conducting means, the at least one measuring device, and the terminating elements is one of secured and thermally coupled to the support.

34. The device of claim 33, wherein the support made of a metal with a good thermal conductivity.

35. The device of claim 1, wherein the primary magnetic field in the at least one partial area is oriented substantially perpendicular to the motion direction of the moving body.

* * * * *